United States Patent [19] [11] 4,185,504
Exner et al. [45] Jan. 29, 1980

[54] APPARATUS FOR MEASURING THE PRE-TENSION OF A THREADED BOLT

[75] Inventors: Gerhard Exner; Volfango Festinori; Detlef Luckschus, all of Berlin, Fed. Rep. of Germany

[73] Assignee: Kraftwerk Union Aktiengesellschaft, Mülheim, Fed. Rep. of Germany

[21] Appl. No.: 954,848

[22] Filed: Oct. 26, 1978

[30] Foreign Application Priority Data

Nov. 3, 1977 [DE] Fed. Rep. of Germany ....... 2749536

[51] Int. Cl.² ............................................. G01L 5/24
[52] U.S. Cl. ..................................... 73/761; 81/57.38
[58] Field of Search .............................. 73/761, 847; 116/DIG. 34; 81/52.4 R, 52.4 A, 52.4 B, 57.38; 85/62, 1 T

[56] References Cited

U.S. PATENT DOCUMENTS

| 2,562,831 | 7/1951 | Stone | 73/761 X |
| 2,995,033 | 8/1961 | Stifano, Jr. | 73/761 |
| 3,162,071 | 12/1964 | Biach | 81/57.38 |
| 3,837,694 | 9/1974 | Frisch et al. | 85/1 T |
| 3,877,326 | 4/1975 | Köck et al. | 81/57.38 |
| 3,943,819 | 3/1976 | Charron | 73/761 X |
| 3,995,828 | 12/1976 | Orban | 81/57.38 X |

FOREIGN PATENT DOCUMENTS 2604510 8/1977 Fed. Rep. of Germany ............. 73/761

Primary Examiner—Gerald Goldberg
Assistant Examiner—Joseph W. Roskos
Attorney, Agent, or Firm—Kenyon & Kenyon

[57] ABSTRACT

An apparatus for measuring the pre-tension of a threaded bolt by means of a two part measuring rod introduced into a central hole of the threaded bolt and of a length measuring device.

The measuring rod includes an upper rod threaded to a lower tube which is secured against rotation. Rotation of the threaded rod by a motor moves the end of the measuring rod in or out of the central hole.

5 Claims, 1 Drawing Figure

APPARATUS FOR MEASURING THE PRE-TENSION OF A THREADED BOLT

BACKGROUND OF THE INVENTION

This invention relates to an apparatus for measuring the pre-tension of a threaded bolt used, for example, for closing a reactor pressure vessel; such a bolt is elongated by means of a tensioning device that is portable and can easily be put on and off. The tensioning device may contain a tensioning bolt. The apparatus includes a two part measuring rod which is introduced into a central, closed hole in the threaded bolt and extends down to the lowest point of the hole. The rod passes through the tensioning device and also through the tensioning bolt, if one is used. A length measuring device which determines the difference in length between the threaded bolt and the measuring rod is included.

One such measuring apparatus is shown in U.S. Pat. No. 3,877,326. There, both the threaded bolt used for closing a reactor pressure vessel and the automatic tensioning device which could be put on for supplying the pretension with, optionally, a tensioning bolt, contain contiguous central bore holes forming a passage which is closed at the lowest point of the threaded bolt. A two part measuring rod is introduced into the hole and is screwed in at the lowest point of the hole. When the threaded bolt is elongated and, thus, pretensioned by means of the tensioning device, the measuring rod located in the hole remains unstressed and the pre-tension of the threaded bolt can be determined by measuring the difference in length between the inserted measuring rod and the threaded bolt including the tensioning bolt, if one is used; this difference is determined by a length measuring device such as a dial indicator.

In the measuring device just described, the measuring rod used for measuring the pre-tension must be inserted by hand into the central passage of the threaded bolt as well as that of any tensioning bolt, an operation which takes a substantial amount of time, especially since these parts must be removed again after the measurement. It is an object of the present invention to provide a measuring apparatus which is fastened to the tensioning device, can be transported with it, and in which the measuring rod can be actuated automatically.

BRIEF DESCRIPTION OF THE INVENTION

To solve this problem, a measuring apparatus of the type described above is provided, according to the invention, with a two part measuring rod including an upper, threaded rod and a lower tube and in which both parts are directly or indirectly threaded together. Means are provided for securing the tube against rotation so that when the threaded rod is turned by a motor, the tube will be raised or lowered. The motor itself is provided with a braking device and its housing is mounted for motion longitudinally of the threaded rod, the guide rail being firmly connected to the tightening device. The length measuring device is fastened to the motor mounting and has a part resting on an end face of an extension tube which is directly or indirectly connected, as through a tensioning bolt, to the threaded bolt. The measuring rod is made in two parts so that its length may be approximately cut in half during transportation of the measuring apparatus together with the tensioning device.

Since the lower tube of the measuring rod is secured against rotation, rotary motion transmitted from the motor to the threaded rod screws it into or out of the lower tube; the rotary motion is therefore transformed into rectilinear motion of the tube in the direction of the longitudinal axis of the measuring rod. Thus, one direction of rotation by the drive lengthens the rod until its lower end comes to a stop at the lowest point of the closed hole, a certain amount of contact pressure being obtained by the weight of the motor. Further drive is prevented by the braking device at the motor and the length of the two part threaded rod is thus kept constant. The threaded bolt can now be elongated by the tightening device and the exact magnitude of the pre-tension determined by the length measuring device fastened to the mounting of the motor. After the measurement is made and the desired pre-tension adjusted, the two part measuring rod is shortened again by reversing the direction of rotation of the motor and it is then lifted off together with the tensioning device. The central hole of the threaded bolt is thus made free for nondestructive material inspections which are part of normal maintenance.

To obtain a large contact area at the lowest point of the closed bore hole and, thus, good guidance of the measuring rod in spite of small weight, it is advantageous that the threaded rod be coupled to the tube via a threaded bushing. Then the diameter of the tube can be chosen independently of the thickness of the threaded rod, and an internal thread in the tube is not necessary.

DETAILED DESCRIPTION OF THE INVENTION

Figure 1:
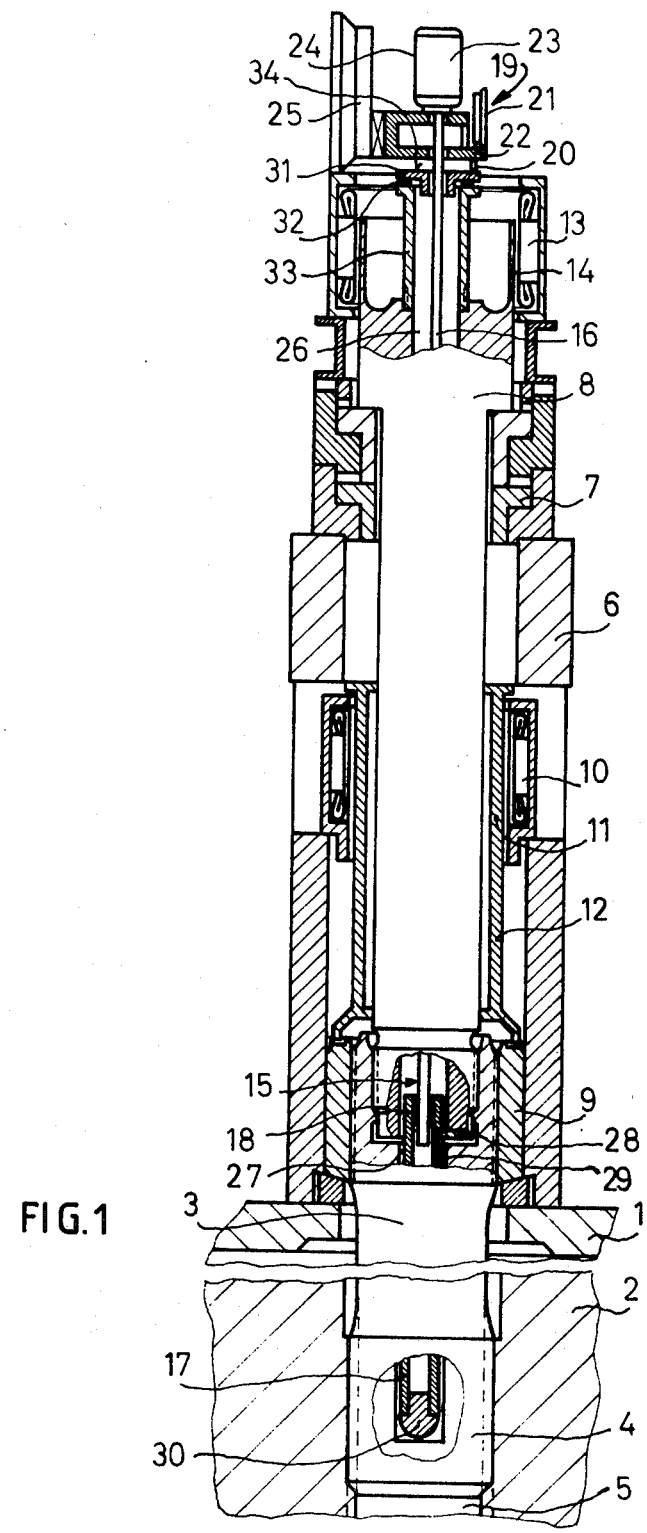
FIG. 1 is a side view in partial cross section of a measuring apparatus made in accordance with the teachings of the invention.

The cover 1 of a reactor pressure vessel 2 is closed by a number of threaded bolts 3, each head 4 of which is in vessel 2. For this purpose it is necessary to give a predetermined pre-tension to the threaded bolt 3 in order to assure tightness of the reactor pressure vessel 2. This pre-tension is obtained by elongating the threaded bolt 3 by means of the superposed, portable, tensioning device 6. The tensioning device 6 contains hydraulically driven piston 7 which acts on the tensioning bolt 8, the later being screwed into the threaded bolt 3. When the desired pre-tension is reached, the nut 9 of the threaded bolt 3 is tightened, for which purpose it is set in rotation by an electric motor 10. To this end, the rotor 11 of the electric motor 10 is connected to the nut 9 via a sleeve 12. The tensioning bolt 8 is screwed into and out of the threaded bolt 3 by an electric motor 13, the rotor of which is formed by a sleeve-like extension 14 of the tensioning bolt 8.

A two part measuring rod 15 consisting of an upper threaded rod 16 and a lower tube 17 is used for measuring the elongation of the threaded bolt 3. Rod 16 and tube 17 are engaged with each other by threads on the rod and a threaded bushing 18 fastened to the upper end of the tube 17. This two part measuring rod 15 cooperates with a measuring apparatus 19 which contains a length measuring device 20 having an optical indicator 21.

The measuring apparatus 19, together with the two part measuring rod 15, is arranged on a guide rail 25 which is, in turn, firmly connected to the tensioning device 6 by means of the mounting 22. Mounting 22 also supports the length measuring device 20 and the housing 23 of an electric motor 24, the latter being provided with a magnetic brake (not shown) and driving the threaded rod 16. The mounting 22 therefore moves on guide rail 25 in the longitudinal direction of the threaded rod 16.

The two part measuring rod 15 passes through a central bore hole 26 of the tensioning rod or bolt 8 and a corresponding central hole 27 of the threaded bolt 3. The hole 27 extends down into the head 4 of the threaded bolt 3 and is closed there at the bottom, in the illustrated embodiment, by end plug 30. To secure the tube 17 against rotation, a key 28 is fastened in the tensioning bolt 8 and projects into an outer longitudinal slot 29 of the tube 17.

To insert the two part measuring rod 15, the rotary motion of the electric motor 24 is transformed by blocking rotation of the tube 17 by means of the key 28, so that the screw action of the threaded parts produces a corresponding up or down movement in the longitudinal direction of the threaded rod 16. To insert the measuring rod 15, the electric motor 24 turns the threaded rod 16 until the lower tube 17 comes to a stop with its end part 30 at the lowest point of the closed bore hole 27. Driving of the motor 24 continues and the motor 27, moving together with its mounting 22 on the guide rail 25, is lifted off of bushing 31. Bushing 31 is supported by antifriction bearings 32 on the end face of an extension tube 33 screwed into the tensioning bolt 8 and prevents coupling of motion to mounting 22 by friction contact with tube 33. When a distance is obtained between the end face 34 of the bushing 31 and the mounting 22 which is greater than the expected elongation of the threaded bolt 2 plus the tensioning bolt 8, further rotation of the motor 24 is prevented by the magnetic brake fixing the length of the two-part measuring rod 15. The weight of the mounting and the motor 24 ensures a certain amount of contact pressure by the measuring rod 15 on the lowest point of the bore hole 27.

When the threaded bolt 3 is elongated by means of the tensioning device 6 acting through the tensioning bolt 8, the top of the threaded bolt 3 along with the tensioning bolt 8 and the extension tube 33 fastened thereto are displaced relative to the unstressed two part measuring rod 15. The elongation of the threaded bolt 3 and therefore, its pretension, can therefore by read on the optical indicator 21 of the length measuring device 19. When the desired pre-tension is obtained, the nut 9 on the threaded bolt 3 is tightened to retain the desired pre-tension. The tube 17 is then moved up by rotating the threaded rod 16 in the opposite direction so that it emerges from the threaded bolt 3 and can be lifted off together with the tensioning device 6 and the tensioning bolt 8. The motor 24 is once more supported by its mounting 22 on the end face 34 of the bushing 31. Because it is supported by means of the antifriction bearings 32, the rotary motion of the tensioning bolt 8 as it is screwed out of the threaded bolt 3 is not transmitted to the measuring apparatus 19.

What is claimed is:

1. In an apparatus for measuring the pre-tension of a threaded bolt useful with a portable tensioning device for closing a reactor pressure vessel and having a measuring rod for insertion through the tensioning device and any associated tensioning bolt to the lowest point of a central, closed hole in the threaded bolt and a measuring device for determining the difference in length between the threaded bolt and the measuring rod, the improvement comprising:
    a two-part measuring rod having an upper threaded rod part and a lower tube threadedly engaged with the upper part and secured against rotation,
    a guide rail connected to the tensioning device and supporting a mounting for motion in the longitudinal direction of the threaded rod,
    a motor having a housing and a braking device carried on the mounting, the motor being connected to the measuring rod for turning it, and
    a length measuring device fastened on the mounting and having a part resting on an end face of an extension part directly or indirectly connected to the threaded bolt.

2. In a measuring apparatus in accordance with claim 1, the further improvement comprising the threaded rod being driven by an electric motor having an electric brake.

3. In a measuring apparatus in accordance with claim 1, the further improvement comprising the threaded rod being in engagement with the tube via a threaded bushing.

4. In a measuring apparatus in accordance with claim 1, the further improvement comprising a key guided in the tensioning bolt and engaging an outer longitudinal slot of the tube for securing the tube against rotation.

5. In a measuring apparatus in accordance with claim 1, the further improvement comprising a bushing supported on the end face of the extension part for supporting the length measuring device.

* * * * *